(12) United States Patent
Chen et al.

(10) Patent No.: US 6,823,711 B1
(45) Date of Patent: Nov. 30, 2004

(54) STATIC AND DYNAMIC CALIBRATION OF QUARTZ PRESSURE TRANSDUCERS

(75) Inventors: Dingding Chen, Plano, TX (US); Roger L. Schultz, Aubrey, TX (US); Craig Zitterich, Corinth, TX (US); Martin T. Hagan, Stillwater, OK (US); Meng Fun, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/430,945

(22) Filed: May 7, 2003

(51) Int. Cl.[7] ............................................. G01L 27/00
(52) U.S. Cl. ........................................................ 73/1.59
(58) Field of Search ........................ 73/702, 708, 714, 73/1.59–1.64

(56) References Cited

U.S. PATENT DOCUMENTS

| | | | |
|---|---|---|---|
| 4,339,943 A | * 7/1982 | Hedrick | 73/1.63 |
| 4,414,853 A | 11/1983 | Bryzek | 340/879.83 |
| 4,607,530 A | 8/1986 | Chow | 73/702 |
| 5,471,882 A | 12/1995 | Wiggins | 73/702 |
| 6,278,811 B1 | * 8/2001 | Hay et al. | 385/13 |
| 6,594,602 B1 | 7/2003 | Schultz | 702/104 |

* cited by examiner

*Primary Examiner*—William Oen
(74) *Attorney, Agent, or Firm*—Albert C. Metrailer

(57) ABSTRACT

A system and method for dynamically calibrating signals from a quartz pressure sensor to correct for temperature transients. A series of differences of time spaced temperature readings is stored in a tapped delay line and coupled to a transfer function. The transfer function uses the temperature difference values to correct pressure frequency readings for temperature transient errors. In one form, one transfer function uses temperature and pressure readings to statically calibrate pressure readings and a second transfer function uses temperature differences to provide a temperature transient correction which is added to the statically calibrated pressure value.

29 Claims, 6 Drawing Sheets

STATIC AND DYNAMIC CALIBRATION OF QUARTZ PRESSURE TRANSDUCERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to measurement of pressure using quartz pressure transducers and more particularly to a system and method for both statically and dynamically calibrating transducer output signals for affects of temperature and temperature transients.

BACKGROUND OF THE INVENTION

Piezoelectric quartz crystal oscillators are often used as pressure or temperature sensors. These devices are generally designed so that pressure or temperature induced stresses cause the resonant frequency of the device to change. The resonant frequency can be measured or recorded and converted to pressure or temperature values. These devices are quite accurate and have become standard devices for measuring pressure in boreholes, for example oil and gas wells, where very high pressures may be encountered and need to be accurately measured.

The quartz crystal oscillators are actually sensitive to both pressure and temperature. The crystal orientation may be selected to, for example, increase the sensitivity to pressure while decreasing sensitivity to temperature and vice versa. However, a crystal designed for pressure sensing is still sensitive to temperature. That is, at a fixed pressure, the crystal resonant frequency still changes with temperature. Likewise, a crystal designed for temperature sensing will change resonant frequency in response to changing pressure at a constant temperature.

The relationship of resonant frequency of a quartz crystal oscillator to, for example, pressure is nonlinear. That is, the actual or gauge pressure cannot be obtained by multiplying the frequency by a constant. High order polynomial functions have been developed for converting the frequency of a pressure transducer, the pressure frequency, to actual pressure. These polynomials may be developed based on actual measurement of pressure frequencies at a plurality of known stabilized pressures and temperatures. Once the polynomial has been developed for a given transducer, it may be used in field operations to provide pressure outputs from pressure frequencies or it may be used to process pressure frequency data which has been recorded previously. So long as the pressure frequency measurements are taken when the quartz crystal temperature has stabilized and an accurate temperature reading is available, the resulting pressure measurements are very accurate and accepted as an industry standard.

The conversion of pressure or temperature frequencies to actual pressure and temperature values is referred to a calibration of the sensor outputs. It not only converts the frequencies to normal pressure and temperature values, like pounds per square inch and degrees, but compensates for nonlinearities and the affect of temperature on pressure frequency and vice versa. However, such calibration assumes that the transducer conditions have stabilized when readings are taken. The polynomial is developed based on frequencies measured only after the temperature of the transducers has equalized throughout the entire quartz crystal.

It is known that temperature transients cause errors in calibration of quartz sensor outputs with the known calibration functions. For example, if the temperature of fluid surrounding a quartz transducer is changed, the pressure frequency will change indicating a change in pressure, even if the ambient fluid pressure actually remains constant. After a period of time in which the temperature throughout the quartz crystal equalizes to the new temperature, the pressure frequency will return to the value expected for the actual ambient pressure and temperature. The temperature transient causes thermal gradients in the crystal which creates a real pressure stress on the quartz crystal until the temperature of the crystal equalizes. For example, if ambient temperature drops, the outer surface of the crystal cools first and shrinks. This applies a compressive force (in addition to the force applied by ambient fluids) on the inner portion of the crystal which is still at a higher temperature. When the crystal temperature equalizes, the temperature induced stress is eliminated.

Measurement errors caused by transients complicate and increase the cost of measuring pressures and temperatures in wellbores. Temperatures and pressures are measured in wells in various types of operations. In a logging operation, a sonde having various transducers, including pressure and temperature transducers, may be continuously moved up or down in a borehole to produce a continuous record of pressure, temperature, etc. which may be plotted versus depth position. If the device passes from a first region at a first temperature to a second region at a second temperature, the pressure frequency will change even if no actual change in pressure occurred. By moving the sonde slowly, the errors can be minimized, but the increased time translates to increased cost of the operation. In other operations, such as drill stem tests, a device may measure temperature and pressure at a fixed location in a well while fluids are produced from, or injected into, the well. Such operations cause pressure changes which need to be measured accurately, but also cause temperature transients which cause errors in the pressure measurements.

It would be desirable to provide a calibration system and method for quartz oscillator transducers which not only calibrate the transducer outputs for static conditions, but also dynamically correct for transient conditions.

SUMMARY OF THE INVENTION

In the present invention, one or more temperature difference values, i.e. change of temperature with time, are used to correct temperature transient errors in pressure frequency outputs of a quartz pressure transducer. In a preferred form, multiple temperature difference values are coupled through a tapped delay line to a transfer function which corrects the temperature transient errors.

In one embodiment of the invention, a single transfer function or model is used to calibrate pressure frequencies from a quartz pressure transducer. Inputs to the model include the pressure frequency, a temperature sensor output, and a time spaced series of temperature difference values.

The single model provides both static and dynamic calibration of the pressure frequency outputs of the quartz pressure transducer.

In another embodiment, separate static and dynamic calibration functions are used. A static calibration function receives pressure frequency values and temperature sensor outputs and produces a statically corrected pressure value. A dynamic calibration model receives at least one temperature difference value and generates an output indicating the error in pressure frequency caused by temperature transients. The error value may be combined with the statically calibrated value to provide a pressure value corrected for both static conditions and temperature transient conditions.

DETAILED DESCRIPTION OF THE INVENTION

Figure 1:
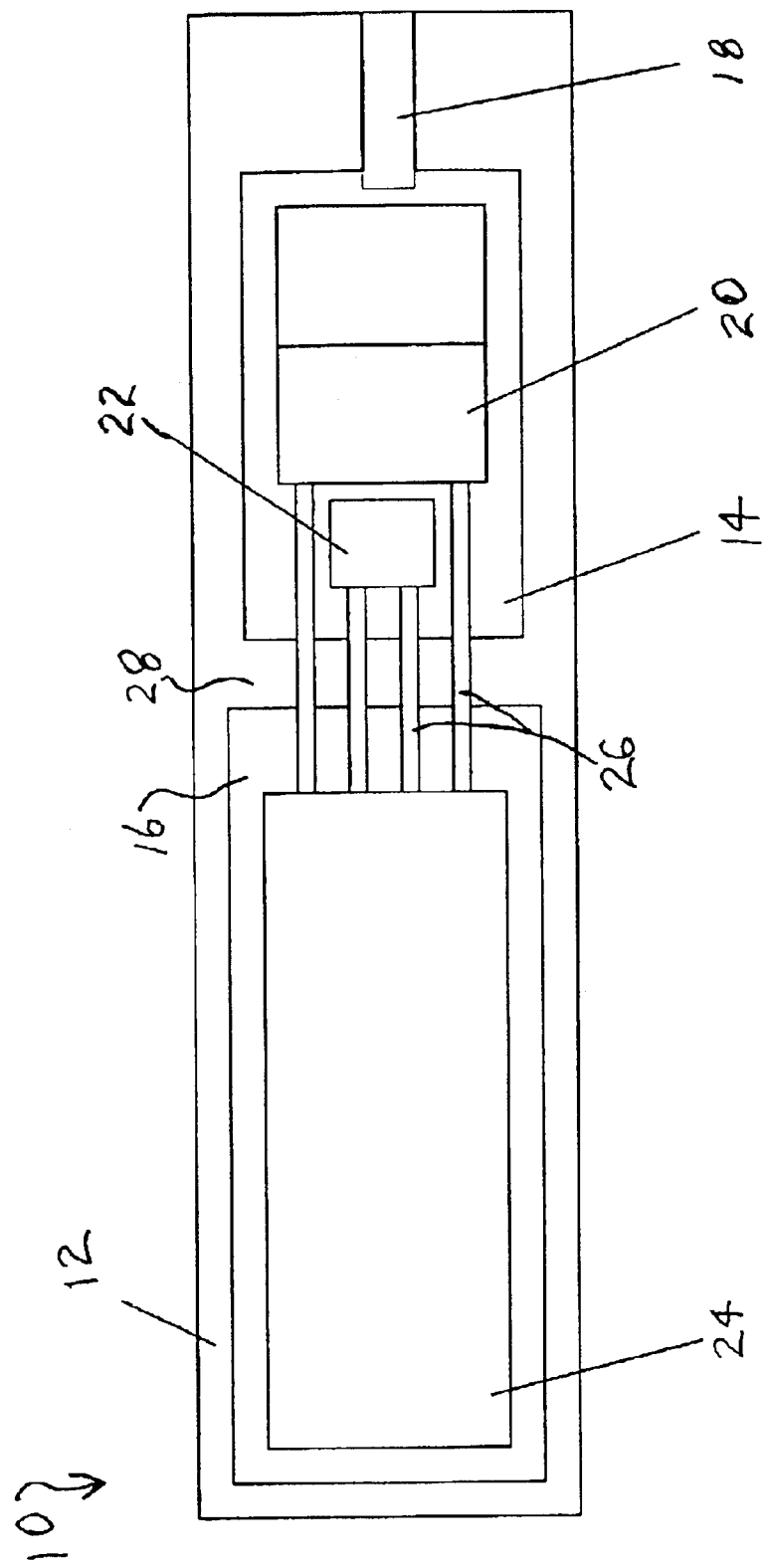
FIG. 1 is a block diagram of a quartz pressure and temperature measurement assembly useful in the present invention.

With reference to FIG. 1, a typical quartz pressure transducer, QPT, assembly 10 is illustrated in block diagram form. The assembly 10 includes a protective housing 12 having a sensor chamber 14 and an electronics chamber 16. The sensor chamber 14 has a port 18 which allows the chamber to be exposed to ambient pressure. Two or more sensors are carried within chamber 14. One is a quartz pressure crystal 20. Another is a temperature sensor 22. In this embodiment, temperature sensor 22 is a quartz temperature crystal. It will be apparent that other temperature sensors may be used if desired. In any case, it is desirable that the temperature sensor 22 be located near the pressure sensor 20 so that it can sense the temperature of the fluids contacting the pressure sensor.

Within electronics chamber 16 is an electronics package 24. The chamber 16 is typically sealed from external fluids to protect the electronics package 24. Electrical connections 26 are provided through an interior wall 28 separating chambers 14 and 16. The electronics package 24 contains the electronic circuitry which causes the crystals 20 and 22 to oscillate at their resonant frequencies. Package 24 may also contain calibration circuitry according to the present invention, or it may contain recording equipment to store the raw output data, e.g. pressure frequency and temperature frequency, from sensors 20 and 22. The package 24 may also contain telemetry circuitry to transmit measurements to remote receivers, for example at the surface location of a well.

Before actual field use, the assembly 10 is placed in test apparatus where it can be exposed to a range of known pressure and temperature conditions. Typically, a temperature is fixed for a period of time sufficient to eliminate temperature gradients in the sensors and then pressure is adjusted through a number of steps. The temperature is then adjusted, allowed to stabilize and the pressure is again cycled. The pressure and temperature frequencies are recorded for each of these conditions. The measured pressure and temperature frequencies and known actual temperatures and pressures are then used to develop a model or transfer function which converts pressure and temperature frequencies to pressure and temperature units such as pounds per square inch and degrees. The model may be a linear model like a high order polynomial or may be a nonlinear model such as a neural network. In field operations, actual pressure and temperature frequency readings are input to the model which then produces outputs of pressure, and if desired temperature, in standard engineering units. This type of system is known to produce very accurate pressure and temperature values so long as the sensors are operating under stabilized temperature conditions. However, during temperature transients when temperature gradients occur in the pressure sensor, the resulting pressure readings may contain significant errors.

Figures 2A, 2B:
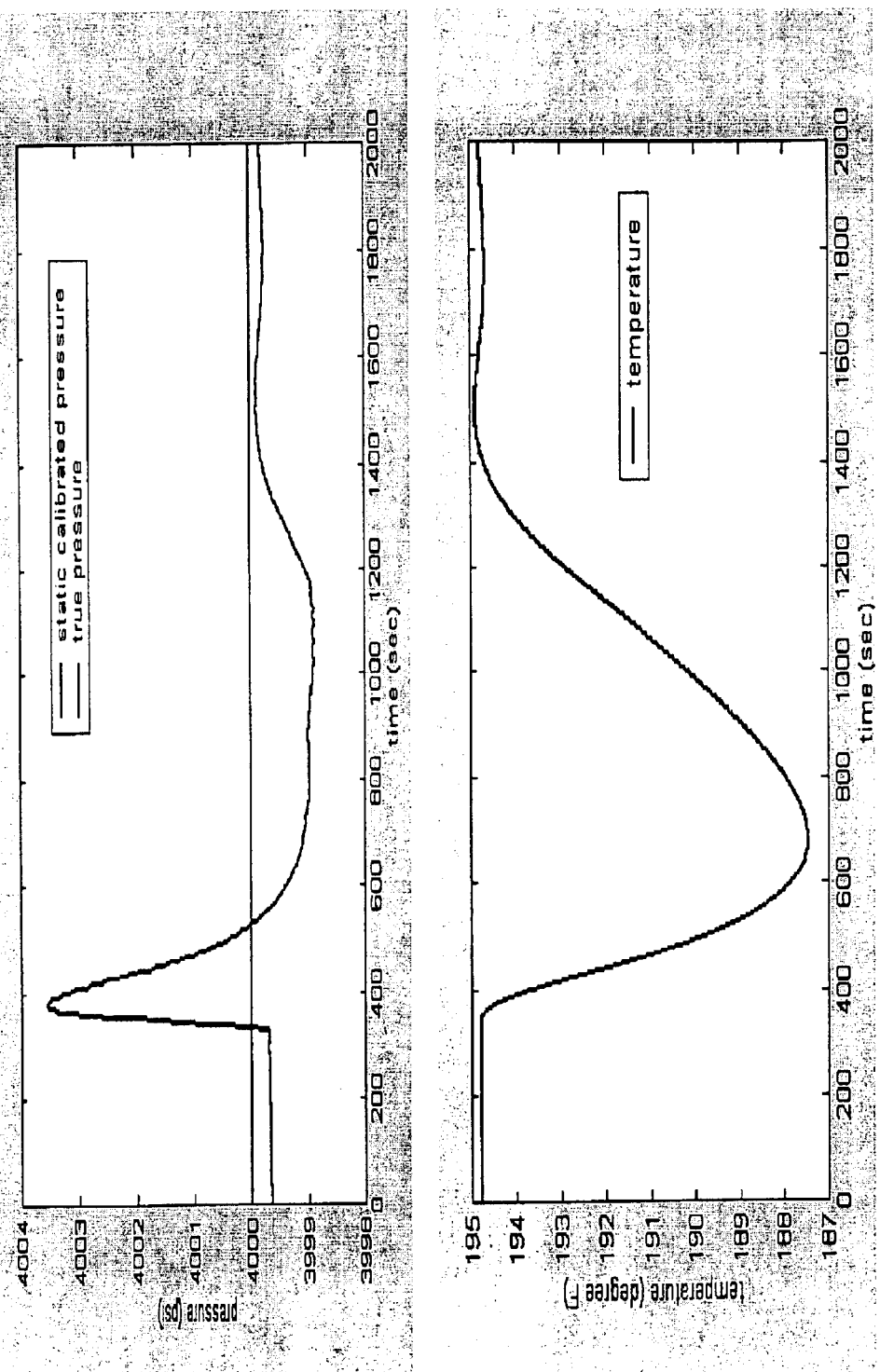
FIGS. 2a and 2b are plots of statically corrected pressure values and a temperature transient versus time.

With reference to FIGS. 2a and 2b, the effect of temperature transients on statically calibrated pressure frequency readings is illustrated. FIG. 2a represents the pressure reading produced by static calibration of a pressure frequency and FIG. 2b plots temperature measured by a temperature sensor near the pressure sensor. At time zero, a QPT assembly was operating at about 4000 pounds per square inch and about 195 degrees Fahrenheit. From about 300 to about 700 seconds, the ambient temperature was dropped to about 187 degrees and then returned to 195 degrees from about 700 to about 1400 seconds. In response to the temperature drop at about 400 seconds, the indicated pressure increased by about five pounds per square inch, even though actual pressure did not change. As the temperature rose back to its original value between 700 and 1200 seconds, the indicated pressure was lower than actual pressure. Once the temperature stabilized, the statically corrected pressure again indicated the actual pressure.

FIGS. 2a and 2b illustrate several relationships between a temperature transient and error in statically calibrated pressure frequency measurements which contributed to development of the present invention. The error is generally related to the slope of the temperature curve, that is the rate of change of temperature with time. In addition, the pressure change appears in the pressure plot earlier in time than the temperature change. As discussed in the background section, a reduction in ambient temperature cools the outer surface of a quartz transducer very quickly and increases stress on the oscillating crystal. This stress increase occurs quickly since only the outer surface must be cooled to cause the effect. However, a quartz temperature sensor changes its resonance frequency in response to a change of temperature of the bulk of the crystal. Thus, it takes longer for the temperature sensing crystal to react to or indicate a temperature change.

Figure 3:
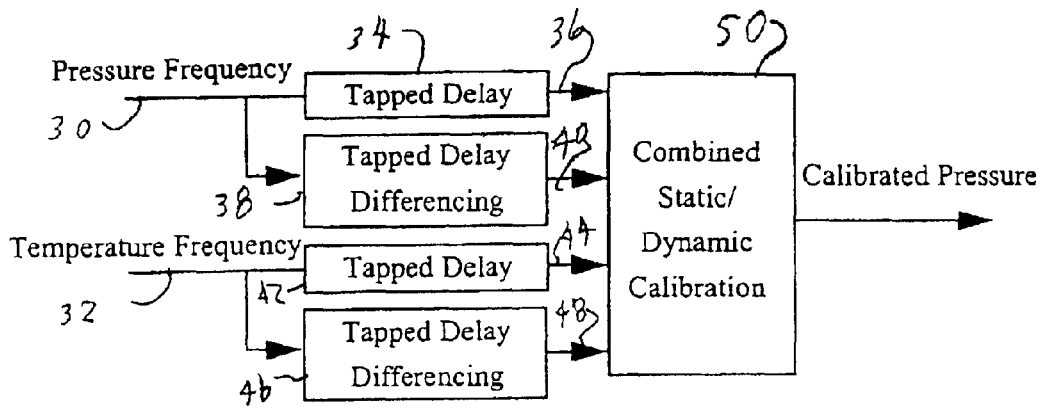
FIG. 3 is a block diagram illustrating one embodiment of a method and system according to the present invention.

With reference now to FIG. 3, an embodiment of the present invention is illustrated in block diagram form. In this embodiment, pressure frequency readings from a quartz pressure crystal 20 (FIG. 1) are coupled to an input 30.

Temperature frequency readings from sensor 22 (FIG. 1) are coupled to an input 32. The pressure frequency readings are coupled to a tapped delay line 34. The delay line 34 stores a time spaced series of pressure frequencies and provides all of the stored values at its output 36, which represents a plurality of outputs. The pressure frequencies at input 32 are also coupled to a tapped delay line 38 which stores differences between successive pressure frequency readings. Thus, if there is no change in pressure frequency from one reading to the next, the stored value will be zero. Each of the stored difference values is provided at an output 40 which represents a plurality of outputs.

The temperature frequency readings on line 32 are coupled to a tapped delay line 42. The delay line 42 stores a time spaced series of temperature frequencies and provides all of the stored values at its output 44, which represents a plurality of outputs. The temperature frequencies at input 32 are also coupled to a tapped delay line 46 which stores differences between successive temperature frequency readings. Thus, if there is no change in temperature frequency from one reading to the next, the stored value will be zero. Each of the stored difference values is provided at an output 48 which represents a plurality of outputs.

All of the outputs 36, 40, 44, and 48 of tapped delay lines 34, 38, 42, and 44 are coupled to a combined static and dynamic calibration model or unit 50. The unit 50 may contain a high order polynomial or a neural network, either of which has been developed based on pressure frequency and temperature frequency values collected in test chambers as discussed above. However, to provide for dynamic calibration, the test or laboratory data collection process must be expanded to collect transient data. As noted above, static calibration models are based only on temperature and pressure frequency readings taken at known stabilized temperature and pressure set points. For dynamic calibration, multiple time spaced temperature and pressure frequency readings are taken during temperature changes in the test chamber. FIGS. 2a and 2b illustrate the type of data collected.

In developing the present invention, two different methods of collecting transient data were used. The laboratory equipment discussed above for collecting static pressure and temperature frequency data includes a temperature controller for maintaining a selected temperature in an oil bath while the pressure of the oil is adjusted to various levels. The oil is circulated as part of the temperature control process and to maintain a constant temperature throughout the chamber. As discussed above, for static calibration, the laboratory readings of pressure temperature and frequency are taken only when the oil bath and crystal temperature has stabilized. After various pressure readings have been taken at a first temperature, the setting of the temperature controller is normally adjusted and, for static calibration, no more readings are taken until the controller has changed the oil bath temperature and the crystals have stabilized. In one method of collecting transient data according to the present invention, pressure and temperature frequency readings are taken during the change of temperature from each temperature controller setting to the next while the pressure is held constant. In a second method, a quantity of oil at a different temperature is flowed into the test chamber to cause a sudden temperature change and then the controller is allowed to automatically return the bath to its setting. Temperature and pressure frequency readings are taken during the time the oil is added to the bath and the time during which the controller returns the bath to its set temperature. The temperature transient shown in FIG. 2b was generated in this second method by flowing a quantity of cold oil into the oil bath. Data is preferably collected using both types of temperature transients.

The collection of temperature transient data for dynamic calibration presents some challenges to the laboratory data collection processes. The temperature transients can cause some uncertainty in the actual pressure value of the test oil bath, which must be accounted for. The laboratory system used in the present invention used a dead weight tester, i.e. a system which uses a known weight to apply the reference pressure to the test fluid through a piston. As temperature of the oil bath is increased, its volume increases. The volume increase will cause the elevation of the weight to rise, and the head of the fluid below the weight to increase. The increased fluid head causes a small increase in test chamber fluid pressure. During expansion or contraction of the test chamber fluid, the fluid must flow into or from the test chamber, and this causes a small dynamic pressure change. The changes in temperature may also cause the dimensions of the piston which transfers the dead weight force to the fluid to change slightly, which also changes the pressure in the fluid. These transient effects on the test chamber pressure are small, but are detectable and can be accounted for during the data collection process which is controlled by a computer system. Thus, while the collection of transient data is described as a process of collecting pressure and temperature frequency data at a constant pressure while the temperature is changed, the reference pressure may change slightly during the process, but the changes can be accounted for.

In the FIG. 3 embodiment, the calibration model performs both static and dynamic calibration of pressure frequency readings, similar to embodiments disclosed in U.S. patent application Ser. No. 09/298,691, filed Apr. 23, 1999 by inventor Roger L. Schultz which is assigned to the assignee of the present invention and which application is hereby incorporated by reference for all purposes. The present invention uses time spaced frequency difference values in addition to time spaced frequency values. Due to the possible large number of inputs, development of the calibration model is complex. In addition, since the same model makes both static and dynamic corrections, there is a chance that the model will actually add error by making dynamic corrections when none is needed.

Figure 4:
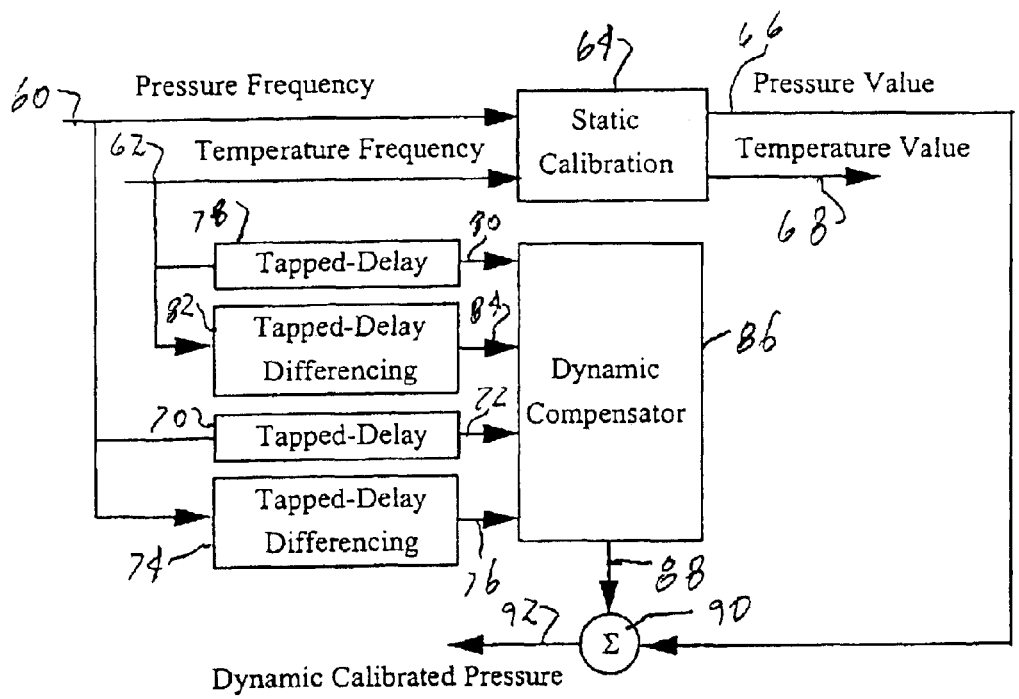
FIG. 4 is a block diagram illustrating a second embodiment of a method and system according to the present invention.

With reference to FIG. 4, there is illustrated an embodiment of the present invention in which static and dynamic calibration are performed with separate calibration units, the outputs of which are combined. In this embodiment, pressure frequency readings from a quartz pressure crystal 20 (FIG. 1) are coupled to an input 60. Temperature frequency readings from sensor 22 (FIG. 1) are coupled to an input 62. These inputs 60, 62 are coupled to a static calibration unit 64. Unit 64 may contain a conventional polynomial calibration function which can provide accurate static calibration of a pressure value on output 66 and an accurate static calibration of a temperature value on output 68.

In FIG. 4, the pressure frequency readings on input 60 are also coupled to a tapped delay line 70. The delay line 70 stores a time spaced series of pressure frequencies and provides all of the stored values at its output 72, which represents a plurality of outputs. The pressure frequencies at input 60 are also coupled to a tapped delay differencing line 74 which stores differences between successive pressure frequency readings. Thus, if there is no change in pressure frequency from one reading to the next, the stored value will be zero. Each of the stored difference values is provided at an output 76 which represents a plurality of outputs.

The temperature frequency readings on line 62 are also coupled to a tapped delay line 78. The delay line 78 stores a time spaced series of temperature frequencies and provides all of the stored values at its output 80, which represents a plurality of outputs. The temperature frequencies at input 62 are also coupled to a tapped delay differencing line 82 which stores differences between successive temperature frequency readings. Thus, if there is no change in temperature frequency from one reading to the next, the stored value will be zero. Each of the stored difference values is provided at an output 84 which represents a plurality of outputs.

All of the outputs 72, 76, 80, and 84 of tapped delay lines 70, 74, 78, and 82 are coupled to a dynamic calibration compensation model or unit 86. The unit 86 may contain a simple linear function which forms a weighted sum of the inputs or a neural network, either of which has been developed based on pressure frequency and temperature frequency values, including transient values, collected in a test chamber as discussed above. However, in this embodiment, the model is trained on the error between actual pressure and temperature and the outputs of the static calibration unit 64. In this embodiment, the calibration model 86 performs only dynamic calibration of pressure frequency readings and does this by providing on an output 88 an error correction value, positive or negative, to be added to the pressure value on line 66. An adder 90 receives the outputs 66 and 88 and provides on its output 92 a pressure value which is both statically and dynamically calibrated.

With further reference to FIG. 4, other inputs may be provided to the dynamic compensator 86 if desired. For example, the statically calibrated pressure and temperature values on lines 66 and 68 may be included as inputs. However, as the number of inputs is increased, the complexity of producing a suitable model for compensator 86 increases. As noted above, the outputs 72, 76, 80 and 84 of tapped delay lines 70, 74, 78, and 82 each represent a number of outputs corresponding to the lengths of the delay lines. If the delay lines are long and all the values shown are used, there may be several hundred inputs. However, there are various methods for optimizing inputs when developing models such as are used in the compensator 86. These methods allow selection of only those inputs which have a substantial effect on the model. Stated otherwise, the methods allow unimportant variables to be ignored, making the model less complicated.

Input selection techniques were used to determine which subset of the possible input variables discussed above were most important for dynamic calibration. These techniques indicated that the tapped delay temperature differencing values from delay line 82 were the dominant input variables. In addition, the future values could correct errors more than past values. This is consistent with the observations made above with reference to FIGS. 2a and 2b.

Figure 5:
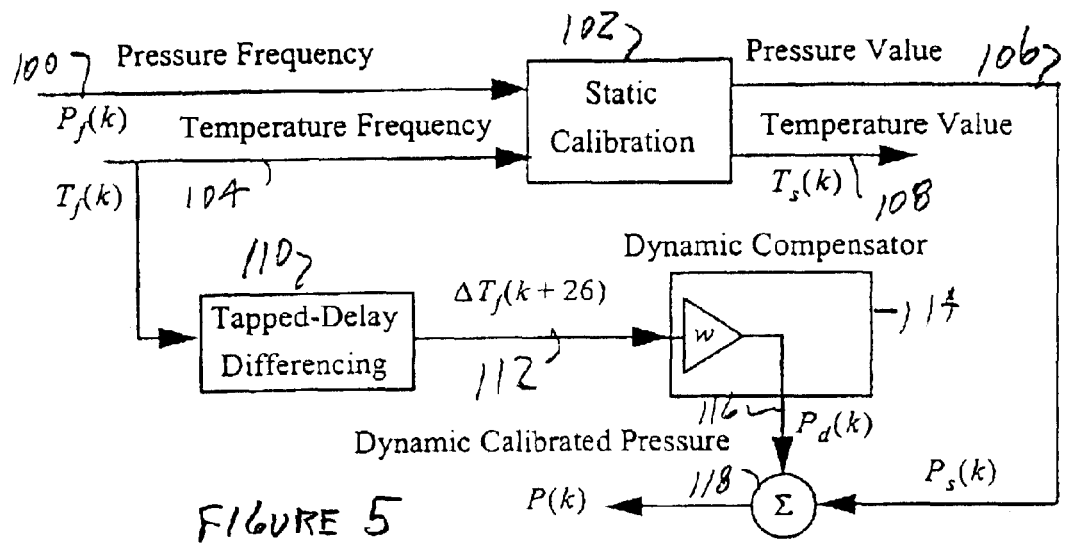
FIG. 5 is a block diagram of another embodiment using a single temperature frequency difference value to provide dynamic calibration.

With reference to FIG. 5, a very simple dynamic compensation system is illustrated. In this system, a single future difference of temperature frequency reading is used to provide dynamic compensation for a statically calibrated pressure reading. In FIG. 5, pressure frequency at time sample k, $P_f(k)$, is coupled by line 100 to an input of a static calibration unit 102. Temperature frequency at time sample k, $T_f(k)$, is coupled by line 104 to a second input of the static calibration unit 102. The static calibration unit provides statically corrected pressure value at time k, $P_S(k)$, on output 106 and statically corrected temperature value at time k, $T_S(k)$ on output 108. The temperature frequency readings on line 104 are also coupled to the input of tapped delay differencing unit 110. Tapped delay unit 110 provides on its output 112 a single output value which is the temperature frequency at time K+26 minus the temperature frequency at time K+25, which is represented as $\Delta T_f(k+26)$. Note that the tapped delay unit 110 is storing and providing future values of the difference of temperature frequencies. This requires that the calculation of the actual pressure at time k, $P_k$, is actually delayed until the future readings of temperature frequency readings are available. In this embodiment, samples are taken at one second intervals, so that the value calculations are delayed by twenty-six seconds.

In FIG. 5, the one temperature frequency difference value on line 112 is coupled to a dynamic compensator 114. Compensator 114 is simply a multiplier which multiplies the temperature difference value, $\Delta T_f(k+26)$, by a simple constant, w, to provide a pressure dynamic correction value $P_d(k)$ at its output 116. This dynamic correction value is summed with the static pressure value, $P_S(k)$, in an adder 118 to generate the final dynamic calibrated pressure at time k, P(k).

The selection of input data subset having the single value, $\Delta T_f(k+26)$ and the value of w were based on a set of test chamber data as discussed above. In this case the test data covered pressures from 2000 to 12000 psi, pounds per square inch, and temperatures from 10 to 125 degrees centigrade. Pressure temperature setpoints representative of the entire two dimensional pressure temperature space were used for training, while other setpoints were reserved for testing. The simple dynamic correction system of FIG. 5 produced surprisingly good results. Error reductions of from 53% to 70% were achieved in training and testing respectively.

As noted above, the particular parameters used in the FIG. 5 embodiment were based on evaluation of the complete test data set and represent somewhat of an average result from that data. Further analysis of the data provided information leading to improved embodiments. Input data selection was performed for individual temperature pressure setpoints. This showed that the best difference value varied from eleven to fifty-one and for the lowest pressure highest temperature setpoint actually became a negative eighty-four. Thus the selection of the twenty-sixth future difference was basically an average value. Further analysis of the test data also indicated that the weighting constant, w, used in the dynamic calibrator 114 should be a function of the pressure and should increase as pressure increases. In addition it was found that the weighting constant is also affected by the specific temperature.

Figure 6:
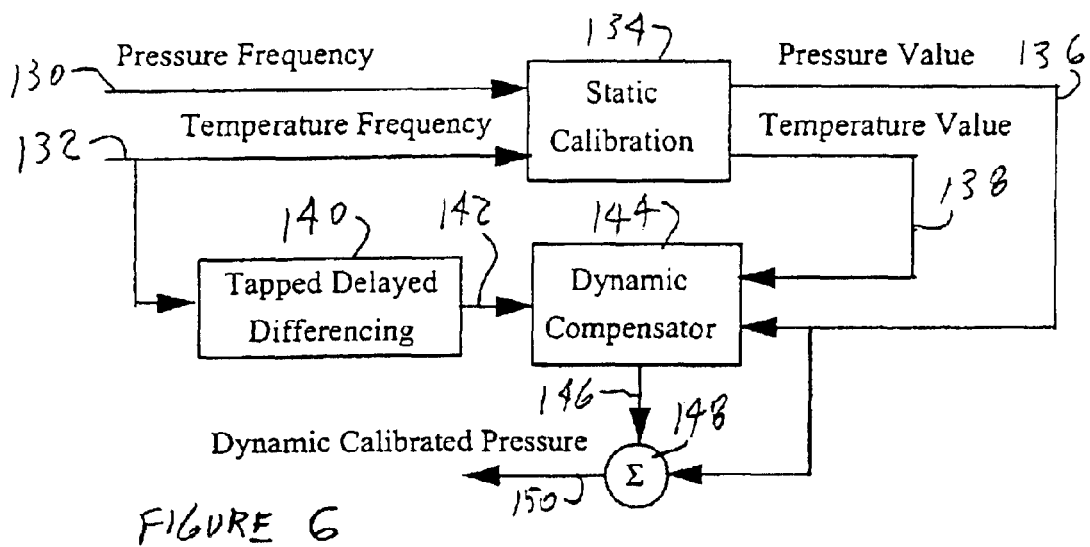
FIG. 6 is a block diagram of an embodiment in which statically corrected pressure and temperature are used to interpolate between multiple dynamic models which use multiple temperature frequency differences to dynamically calibrate pressure values.

With reference to FIG. 6, an embodiment which takes into account these relationships of the data is provided. In FIG. 6, pressure frequency and temperature frequency readings are provided on lines 130 and 132 respectively to inputs of a static calibration unit 134. The unit 134 provides statically calibrated pressure values and temperature values on its output lines 136 and 138 respectively. The temperature frequency readings on line 132 are also coupled to an input of tapped delay differencing unit 140. In this embodiment, tapped delay differencing unit 140 has a length of 101 samples, storing fifty past and future and one current difference values. All 101 difference values are coupled on output 142 to a dynamic compensator unit 144. The statically corrected pressure and temperature values on lines 136 and 138 are also coupled to compensator 144. The compensator 144 provides a dynamic pressure correction value on its output 146 which is coupled to an adder 148. The statically corrected pressure value on line 136 is also coupled to adder 148, which provides a dynamically calibrated pressure value on its output 150.

The dynamic compensator 144 generates the dynamic pressure correction value on output 146 by applying a weighting constant to each of the temperature difference values and summing the total. As noted above, the weighting values can be adjusted according to the pressure and temperature values on lines 136 and 138. This adjustment can be accomplished in a variety of ways. For example, sets of weighting values could be generated for a large number of set points over the desired pressure and temperature space. The sets could be stored in a look up table and selected according to the current pressure and temperature values on lines 136 and 138. However, this would require considerable laboratory work to collect data and a large amount of storage for the constants. In a preferred embodiment, the pressure temperature space is divided into a small number, for example four or six, of representative sections. One model, i.e. set of constants, is produced for each of the sections and stored in the compensator 144. The input temperature difference values on line 142 are processed for each of the stored models for each sample period. Then the current pressure and temperature values on lines 136 and 138 are used to interpolate between the calculated values to produce a final dynamic error correction value on output 146. Testing of this system with four and six selected set points indicated correction of 95% to 96% of the dynamic errors or correction of pressure errors to less than ±1.5 psi.

As discussed above, the FIG. 5 embodiment provided surprisingly good results considering that it uses a single temperature difference value. The FIG. 6 embodiment provided excellent dynamic correction using 101 temperature difference inputs. However, both of these embodiments produce time delayed results, since they use future values delayed by, in these embodiments, from twenty-six to fifty time intervals (seconds). In some applications, for example down hole damage control system, such delays may not be feasible. In all cases, use of a smaller number of temperature difference values will result in a less complicated system than use of a larger number of inputs. Use of a temperature sensor which responds to temperature changes more quickly than a quartz transducer may also reduce the time delays for making transient corrections. Thus there are various choices and tradeoffs to be considered when selecting how many temperature difference values to use and in selecting future samples as inputs for the temperature transient corrections. In any case, the present invention has shown that use of temperature difference values provides an effective way to correct quartz transducer pressure frequency values for errors caused by temperature transients.

Figure 7:
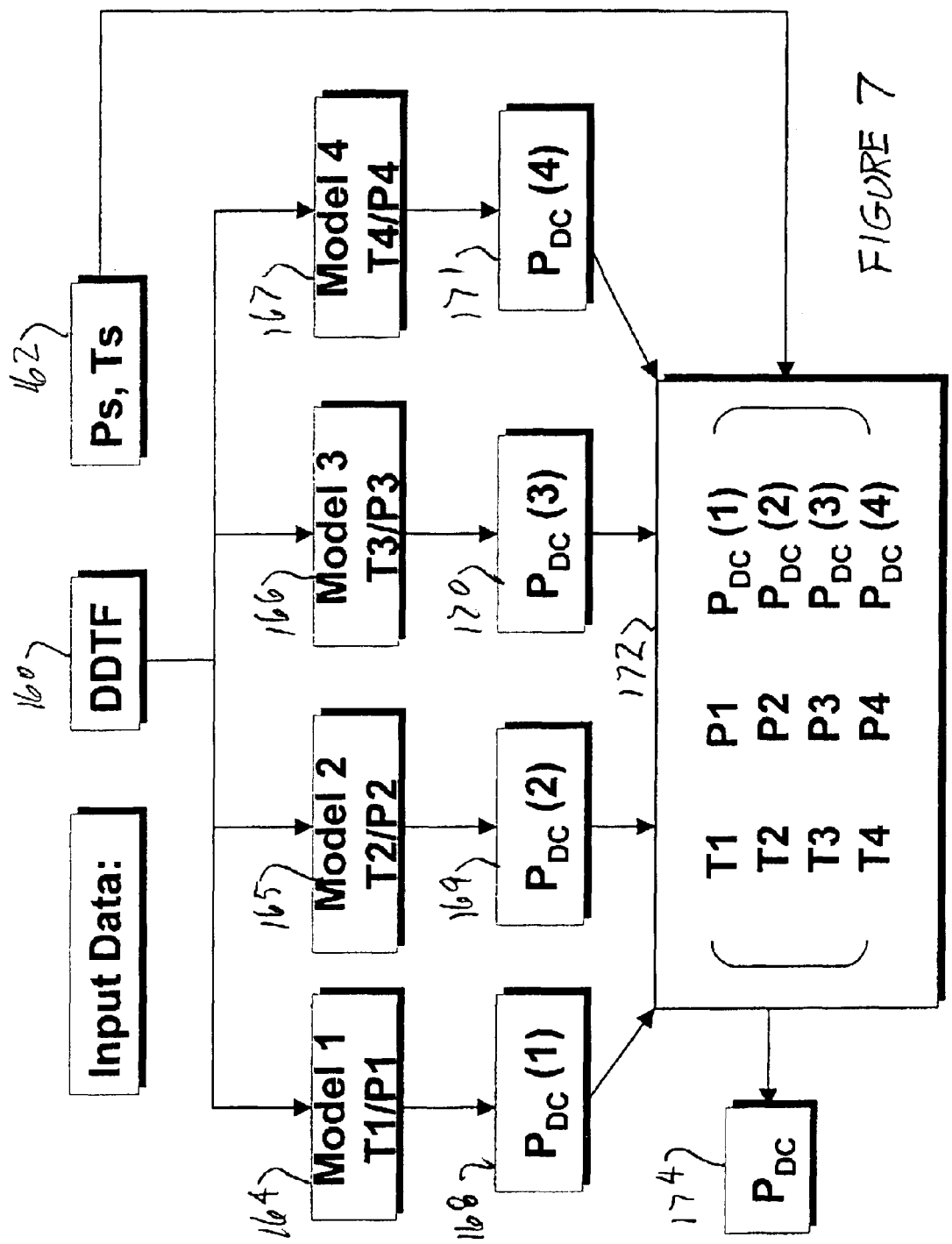
FIG. 7 is a flow diagram illustrating the operation of the system of FIG. 6.

With reference to FIG. 7, the operation of the dynamic compensator 144 of FIG. 6 is shown in flow chart form. In this chart, input data includes the delay line difference of temperature frequency, DDTF, values 160 and the statically corrected pressure value, $P_S$, and temperature value, $T_S$, 162. The DDTF values are coupled to four dynamic correction models 164, 165, 166 and 167, also indicated as Model 1 through Model 4. Each model has been trained for one temperature pressure set point. For example, Model 1 is trained for set point T1/P1. The set points are preferably selected to represent four quadrants of the overall pressure temperature space of interest. Upon receiving the input DDTF values 160, the models 164–167 produce pressure dynamic correction values 168, 169, 170 and 171, also labeled as $P_{DC}(1)$ through $P_{DC}(4)$. As indicated at box 172, each of the correction values $P_{DC}(1)$ through $P_{DC}(4)$ corresponds to a particular temperature pressure set point. The statically calibrated pressure and temperature values 162 are then used to interpolate between the correction values $P_{DC}$ (1) through $P_{DC}(4)$ to produce a final pressure dynamic correction value $P_{DC}$ at 174.

Figure 8:
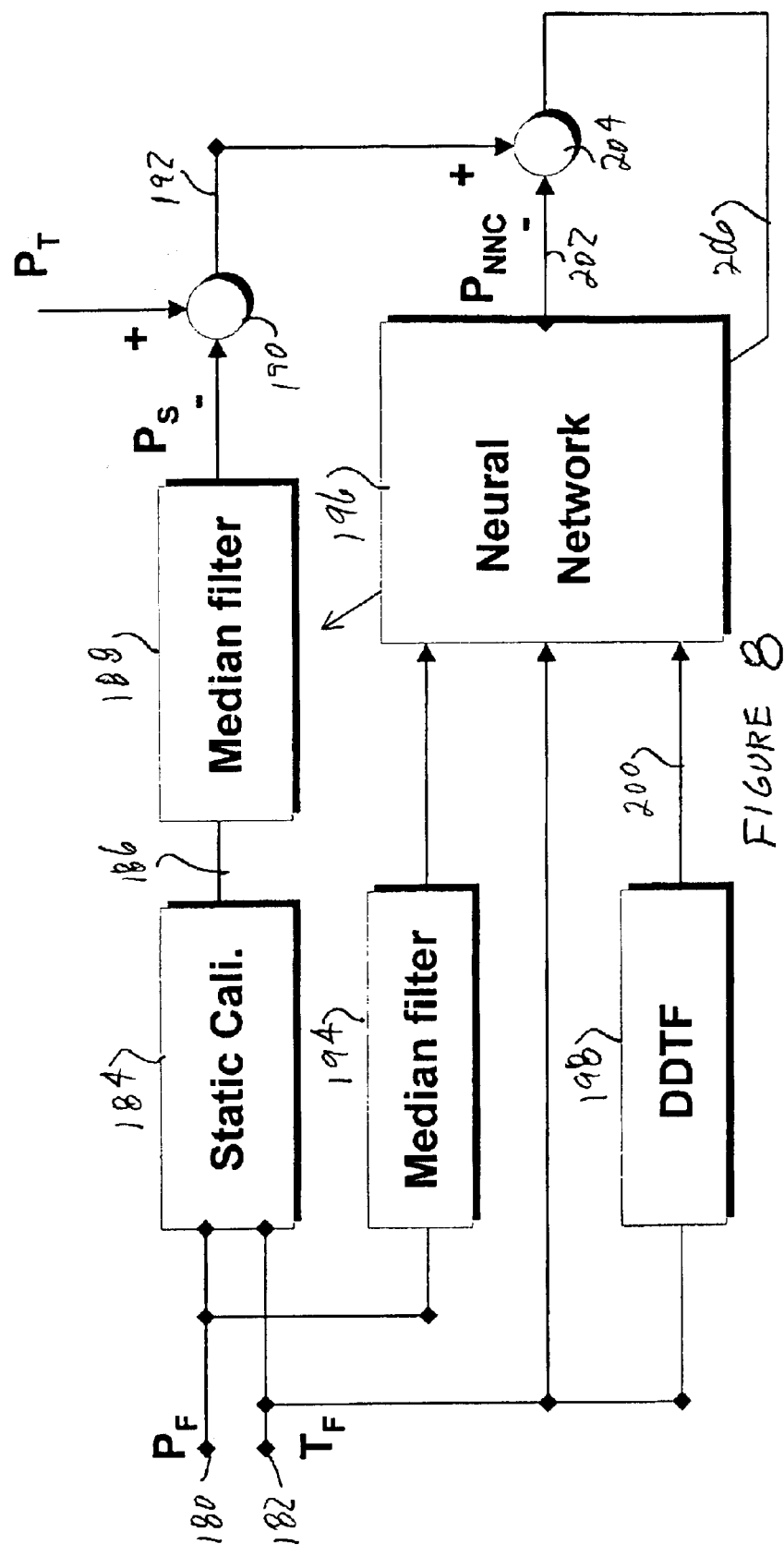
FIG. 8 is a block diagram illustrating the training of a neural network for performing dynamic calibration of pressure frequencies.

As disclosed in the above referenced U.S. patent application Ser. No. 09/298,691, neural networks may by used for calibrating quartz pressure transducer pressure frequency readings. With reference to FIG. 8, an arrangement for training a neural network to perform dynamic calibration of pressure data according to the present invention is provided. Pressure frequency values, $P_F$, are provided on input 180 and temperature frequency values, $T_F$, are provided on input 182. The $P_F$ and $T_F$ values are coupled to a properly programmed static calibration unit 184 which provides statically corrected pressure values on an output 186. The pressure values on output 186 are preferably coupled through a median filter 188 to an adder 190. The adder 190 also receives a true pressure value $P_T$, and provides the difference as an error value on line 192.

The $P_F$ values on input 180 are also coupled, preferably through a median filter 194, to a neural network 196. The $T_F$ values on input 182 are coupled to the neural network 196 and to a tapped delay line of temperature frequency differences, DDTF, 198. The output 200 of DDTF 198 is a plurality of temperature frequency difference values which are also coupled to the neural network 196. The neural network 196 provides an estimated pressure correction value, $P_{NNC}$, on an output 202. The estimated correction value on line 202 is compared to the actual error on line 192 in an adder 204. The difference between actual error and estimated error is provided on adder 204 output 206. The output 206 is coupled back to the neural network during the training exercise to adjust network parameters to drive the difference value on line 206 to zero.

The neural network 196 was implemented with a standard multiplayer feed forward framework. After training as illustrated in FIG. 8, the network may be used to provide dynamic calibration in essentially the same manner as illustrated in embodiments described above. The network uses three inputs, $P_F$, $T_F$, and DDTF. With these inputs, the network 196 produces the dynamic pressure correction values, $P_{NNC}$, which are combined with the output 186 of the static calibrator 184 to produce a fully calibrated pressure value. Since the neural network 196 is nonlinear and receives the $P_F$, and $T_F$ values, it effectively performs the interpolation process described above for the linear transfer functions. The system using a neural network as described was able to reduce thermal transient errors by 95%.

It is apparent that various changes can be made in the apparatus and methods disclosed herein, without departing from the scope of the invention as defined by the appended claims.

What we claim is:

1. A method for correcting quartz transducer pressure frequency data for errors caused by temperature transients, comprising using a difference in temperature values detected near said quartz transducer over a time interval to correct the pressure frequency data.

2. The method according to claim 1, further comprising using a plurality of difference in temperature values detected near said quartz transducer over a plurality of time intervals to correct the pressure frequency data.

3. The method according to claim 1, further comprising using a temperature value detected near said quartz transducer to statically calibrate a pressure frequency value.

4. The method according to claim 3, further comprising using a difference in temperature values detected near said quartz transducer over a time interval to correct statically calibrated pressure frequency data for errors caused by temperature transients.

5. The method according to claim 3, further comprising coupling said quartz transducer pressure frequency data and a measurement of temperature near said quartz transducer to a first transfer function which provides a statically corrected pressure value.

6. The method according to claim 5, further comprising coupling at least one difference in temperature values detected near said quartz transducer over a time interval to a second transfer function which provides a transient correction pressure value.

7. The method according to claim 6, further comprising summing said statically corrected pressure value and said transient correction pressure value to produce a pressure value corrected for both static and transient temperature effects.

8. A method according to claim 6, wherein said second transfer function comprises the sum of the products produced by multiplying said at least one temperature difference values by predetermined constants.

9. A method according to claim 6, wherein said second transfer function comprises a neural network.

10. A method for measuring pressure in an environment having temperature transients, comprising:
    placing a quartz pressure transducer in the environment, said transducer having a resonant frequency output responsive to ambient pressure and temperature,
    placing a temperature sensor in the environment near said quartz pressure transducer, said sensor having an output representative of the ambient temperature,
    using the output of said temperature sensor to produce at least one temperature difference value representing the change in temperature over a time interval, and
    using the output of said temperature sensor and said at least one temperature difference value to convert said resonant frequency output to the pressure of said environment in standard units.

11. A method according to claim 10, further comprising coupling said resonant frequency output and said temperature sensor output to a first transfer function which provides a statically corrected pressure value.

12. A method according to claim 11, wherein said first transfer function is a high order polynomial.

13. A method according to claim 11, further comprising coupling said at least one temperature difference value to a second transfer function which provides a transient correction pressure value.

14. A method according to claim 13, further comprising summing said statically corrected pressure value and said transient correction pressure value to produce a pressure value corrected for both static and transient temperature effects.

15. A method according to claim 13, wherein said second transfer function comprises the sum of the products produced by multiplying said at least one temperature difference values by predetermined constants.

16. A method according to claim 13, wherein said second transfer function comprises a neural network.

17. A method according to claim 10, further comprising using the output of said temperature sensor to produce a plurality of temperature difference values representing the change in temperature over a plurality of time intervals.

18. A method according to claim 17, further comprising storing said plurality of temperature difference values in a tapped delay line having one output for each of said plurality of temperature difference values.

19. A method according to claim 18, further comprising coupling said plurality of temperature difference values to a transfer function which provides a transient correction pressure value.

20. A method according to claim 11, wherein said first transfer function provides a statically corrected temperature value, further comprising:
    coupling said at least one temperature difference value to a plurality of second transfer functions each representing a different pressure temperature combination and each providing a transient correction pressure value;
    using said statically corrected pressure value and said statically corrected temperature value to interpolate between the transient correction pressure values provided by said plurality of second transfer functions and providing a single transient correction pressure value.

21. A system for calibrating pressure frequency values produced by a quartz pressure transducer, comprising:
    a temperature sensor positioned near the quartz pressure transducer, providing temperature values,
    a storage device coupled to said temperature sensor storing at least one difference between successive temperature values and providing said at least one temperature difference value at an output, and
    a dynamic calibration transfer function having inputs receiving said pressure frequency values and said at least one temperature difference value, and having an output providing a dynamically calibrated pressure value.

22. A system according to claim 21, wherein said dynamic calibration transfer function comprises a high order polynomial.

23. A system according to claim 21, wherein said dynamic calibration transfer function comprises an artificial neural network.

24. A system according to claim 21, wherein said dynamic calibration transfer function comprises:
    a first transfer function having inputs receiving said pressure frequency values and said temperature values and having an output providing a statically calibrated pressure and temperature values,
    a second transfer function receiving the outputs of said storage device and providing a correction value for error caused by temperature transients, and
    an adder having inputs receiving said statically calibrated pressure value and said correction value and an output for providing a dynamically calibrated pressure value.

25. A system according to claim 24; further comprising:
    a plurality of second transfer functions, each trained for a different range of pressures and temperatures, and
    an interpolation unit having inputs receiving said statically calibrated pressure and temperature values and the outputs of each of said plurality of second transfer functions and an output providing a pressure correction value.

26. A system according to claim 24, wherein said second transfer function comprises the sum of the products of each output of said tapped delay line multiplied by a predetermined constant.

27. A system according to claim 24, wherein said second transfer function comprises an artificial neural network.

28. A system according to claim 21, wherein said storage devices comprises a tapped delay line.

29. A system according to claim 24, wherein said first transfer function comprises a high order polynomial.

* * * * *